Patented Oct. 18, 1949

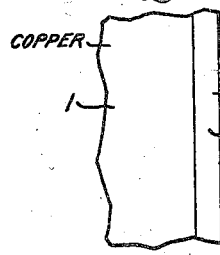
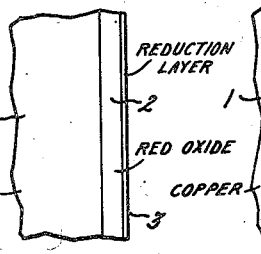
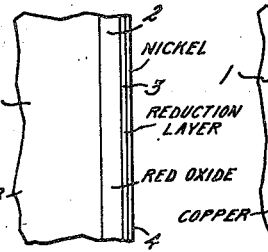
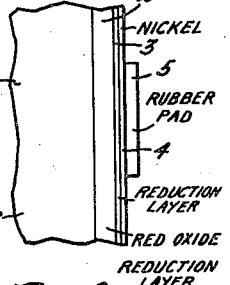
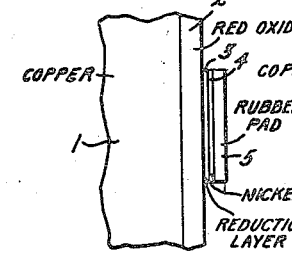
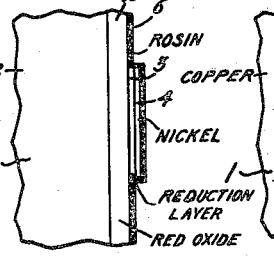
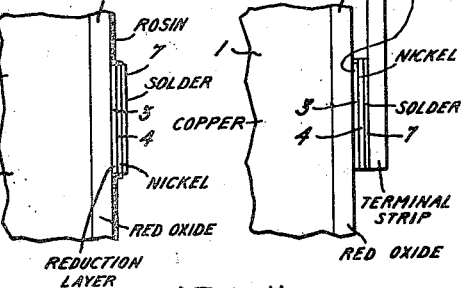
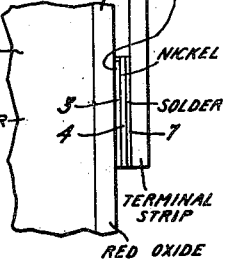
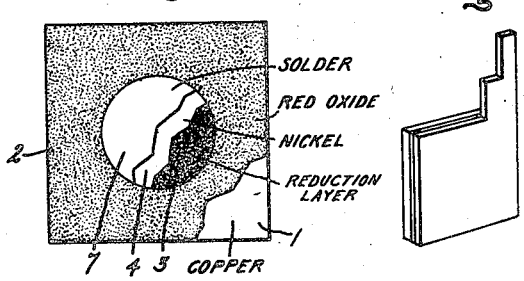
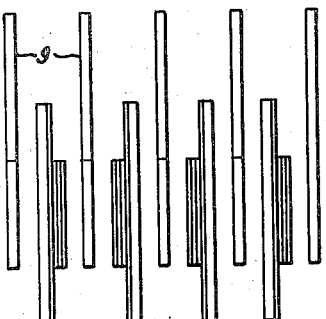
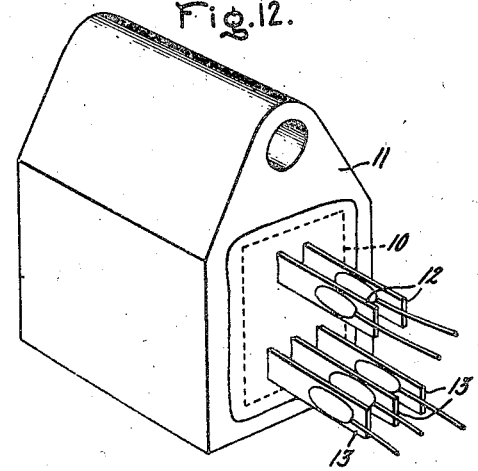
Inventor:
William H. Meiklejohn,
by *Harry E. Dunham*
His Attorney.

2,485,402

UNITED STATES PATENT OFFICE 2,485,402

ELECTRIC RECTIFIER AND METHOD OF PRODUCTION

William H. Meiklejohn, Lynnfield Center, Mass., assignor to General Electric Company, a corporation of New York Application May 21, 1946, Serial No. 671,196

3 Claims. (Cl. 175—366)

The present invention relates to electrical rectifiers of the so-called copper oxide type and comprises both a method and a new structure. Its object is to provide an electric rectifier stack in which a plurality of rectifier elements are joined to adjacent contact plates to form a rugged unitary structure.

Heretofore it has been found to be impracticable to subject copper oxide rectifiers to elevated temperatures as high as about 100° C. Exposure to such elevated temperatures resulted in damage to the rectifiers. For this reason it has been the practice to avoid soldered or welded electrical connections to rectifier elements. Instead, mechanical pressure contacts have been provided between the rectifier units and their electric terminals.

It has been found that, even when such terminals have made initially satisfactory electrical connections, during service of the rectifier assembly the rectifiers became adversely affected. This result was found to be most harmful under conditions of excessive humidity, or in the presence of chemically active fumes. A rectifier of the copper oxide type which is provided with conventional pressure contacts also is apt to be subject to undesired changes in rectifying ratio if operated above about 55° C.

In accordance with my present invention I have overcome these difficulties by providing metallic rectifiers, the rectifying or active elements of which have electric terminals which are integrally joined by a metal bond which is stable at temperatures as high as 200° C. and resists all such adverse conditions. This construction makes it practicable to encase rectifier units in a protective resin or wax which further excludes moisture. Under former conditions of terminal attachment such encasing material would seep while molten between the juxtaposed surfaces, thus spoiling electrical connections.

In accordance with the improved method feature of my invention the terminal elements are joined to the rectifying elements by fusion of interjacent films of alloy in the presence of a protective environment whereby damage to the rectifier by the heat required to effect integral union of metal surfaces is avoided.

The accompanying drawing shows in Figs. 1 to 8 in a diagrammatic manner a series of steps in the fabrication of a copper oxide rectifier element embodying my invention; Fig. 9 shows a terminal element; Fig. 10 is a top view of a rectifier disc having coatings shown partly removed to illustrate the relation of superimposed layers; Fig. 11 shows an assembly of rectifier elements and terminal members; and Fig. 12 shows in perspective an assembly of rectifier elements encased in protective material and fixed within a metal housing.

A rectifier unit of the copper oxide type may be made by oxidizing a foundation plate 1 of copper, Fig. 1 under conditions resulting in a coating of red oxide of copper thereon. This operation may be carried out in the presence of air in a furnace heated to about 1000° C. It is then placed in a second similar type furnace heated to about 600° C. This latter step reduces the forward resistance of the cell, as is well known. The red oxide layer is partially converted by the second heating step to a layer 3 of black oxide as indicated in Fig. 2.

The black oxide and a part of the red oxide are electrolytically reduced to the state of metallic copper and a film 4 of nickel is electrolytically deposited upon the reduced layer as indicated in Fig. 3.

The coatings 3 and 4 are removed from areas of the plate 1 on which they perform no useful function by the following procedure. A circular rubber pad 5, Fig. 4, is applied to a part of the nickel layer to be retained for contact purposes. The pad excludes from the area covered thereby a stripping acid which is applied to the plate, such as a mixture of sulphuric nitric acids diluted with water. This acid treatment removes undesired nickel plating. In order to remove the reduced oxide from the exposed remainder of the surface of the red oxide of copper as indicated in Fig. 5, a solution of chromic acid is applied. The nickel contact 4, which was protected by the rubber pad, remains intact.

The rectifier unit thus made next is encased in a thin layer 6 of rosin as shown in Fig. 6. For this purpose an alcoholic solution of rosin is applied to the unit. The rosin-coated surface of the nickel contact disc next is covered with a layer 7 of solder as indicated in Figs. 7 and 10 and is heated to a temperature high enough to result in an intermetallic diffusion of the solder and nickel. The heat necessary to melt the solder would render a conventional rectifier useless. However, the rosin layer forms a seal around the rectifier element thereby preventing further oxidation or other damage. The solder may consist of an alloy of ⅓ tin, ⅓ lead and ⅓ bismuth by weight which has a melting point as high or higher than 140° C.

Upon solder-coating the nickel contact plate, an assembly of a plurality of rectifier units 8 and adjacent electric contact plates 9 (such as shown in Fig. 9) are assembled to form a stack as conventionally shown in Fig. 11. The assembled stack is heated under pressure to a temperature in the range of about 150° to 200° C. The rosin coating again prevents damage to the assembly as a whole and therefore it is unnecessary to exclude access of air.

Under these conditions of pressure and high temperature the parts of the assembly are sweated together to produce a unitary structure. The stable assembly thus produced will not change in its forward resistance due to aging or heat.

The assembly is further protected against the entry of moisture or chemical fumes by casting a suitable resin or wax about the rectifier assembly. Polystyrene resin, or phenol formaldehyde resin are satisfactory enveloping materials. The assembly surrounded by an envelope 10 of resin as indicated in Fig. 11 may be introduced into a metal housing 11 from which the leads 12, 13 project for making appropriate current connections.

The assembly shown in Fig. 11 may be made part of electrical apparatus in which rectification of alternating current is desired, as for example, a direct current instrument or dynamometer.

What I claim as new and desire to secure by Letters Patent of the United States is:

1. The method of attaching an electric terminal to a copper oxide rectifier which consists in enveloping said rectifier with rosin, applying to a chosen contact surface a film of soldering metal having a melting point of at least 140° C. assembling the rectifier and terminal in contact at the surface covered with solder and heating such assembly while coated with rosin and under pressure to a temperature within a range of about 150° to 200° C.

2. The method of fabricating a copper oxide rectifier which comprises producing on a foundation of copper a layer of oxide, reducing a portion of said oxide layer to a layer of metallic copper, coating said copper layer with nickel, removing said copper layer and said nickel layer from all except a selected contact area of said rectifier, coating said contact area and adjacent areas with rosin, applying to said contact area a film of solder having a melting point of at least 140° C., holding a terminal element under pressure against said solder film, and heating said film and said terminal element to a temperature sufficiently high to cause alloyage of the surfaces thus assembled under pressure.

3. An electric rectifier comprising the combination of a metal foundation plate of copper, a layer of oxide having unilateral conductivity, a film of nickel on said oxide layer, and a metal terminal plate of appreciable area integrally joined directly to said nickel film in the presence of a protective coating of resin and by an alloying metal having a melting point at least as high as about 140° C.

WILLIAM H. MEIKLEJOHN.

REFERENCES CITED

The following references are of record in the file of this patent:

UNITED STATES PATENTS

| Number | Name | Date |
| --- | --- | --- |
| 1,866,351 | Hollnagel | July 5, 1932 |
| 1,894,260 | Anderson et al. | Jan. 17, 1933 |
| 2,126,765 | Freeman | Aug. 16, 1938 |
| 2,215,667 | Sherman | Sept. 24, 1940 |
| 2,215,890 | Taylor | Sept. 24, 1940 |
| 2,221,596 | Lorenz | Nov. 12, 1940 |
| 2,261,618 | Esseling et al. | Nov. 4, 1941 |
| 2,381,025 | Addink | Aug. 7, 1945 |

FOREIGN PATENTS

| Number | Country | Date |
| --- | --- | --- |
| 555,615 | Great Britain | Aug. 31, 1943 |

OTHER REFERENCES

Welding Encyclopedia, 10th ed., pub. by Welding Eng. Pub. Co., page 530.